(12) United States Patent
Lewis et al.

(10) Patent No.: US 7,712,184 B1
(45) Date of Patent: May 11, 2010

(54) CASTER WHEEL HAVING INTEGRATED BRAKING MEANS

(76) Inventors: Steven Lewis, 1005 N. 1st St., Lamesa, TX (US) 79331; Crystal Lewis, 1005 N. 1st St., Lamesa, TX (US) 79331

( * ) Notice: Subject to any disclaimer, the term of this patent is extended or adjusted under 35 U.S.C. 154(b) by 0 days.

(21) Appl. No.: 12/359,365

(22) Filed: Jan. 26, 2009

(51) Int. Cl.
*B60B 33/00* (2006.01)
(52) U.S. Cl. .................. 16/35 R; 16/18 R; 188/1.12
(58) Field of Classification Search .......... 16/35 R, 16/45, 48, 35 D, 18 R; 188/1.12
See application file for complete search history.

(56) References Cited

U.S. PATENT DOCUMENTS

| | | | |
|---|---|---|---|
| 4,414,702 A | 11/1983 | Neumann | |
| 5,184,373 A | 2/1993 | Lange | |
| D342,888 S | 1/1994 | Rutter et al. | |
| 5,774,936 A * | 7/1998 | Vetter | 16/35 R |
| 5,899,469 A * | 5/1999 | Pinto et al. | 280/79.11 |
| 6,125,972 A * | 10/2000 | French et al. | 188/1.12 |
| 6,584,641 B1 | 7/2003 | Milbredt | |
| 6,834,746 B1 | 12/2004 | Lin | |
| 7,017,228 B2 * | 3/2006 | Silverstein et al. | 16/35 R |
| 7,159,695 B2 | 1/2007 | Strong | |

* cited by examiner

*Primary Examiner*—William L. Miller
(74) *Attorney, Agent, or Firm*—Kyle Fletcher

(57) ABSTRACT

The caster wheel having integrated electrical brake involves a standard caster wheel and an electronic braking component that screws into the top surface of the caster wheel mounting bracket. The electrical braking component includes a solenoid that moves a pin up and down to impact a spring-loaded brake mounted underneath the caster wheel mounting bracket.

6 Claims, 3 Drawing Sheets

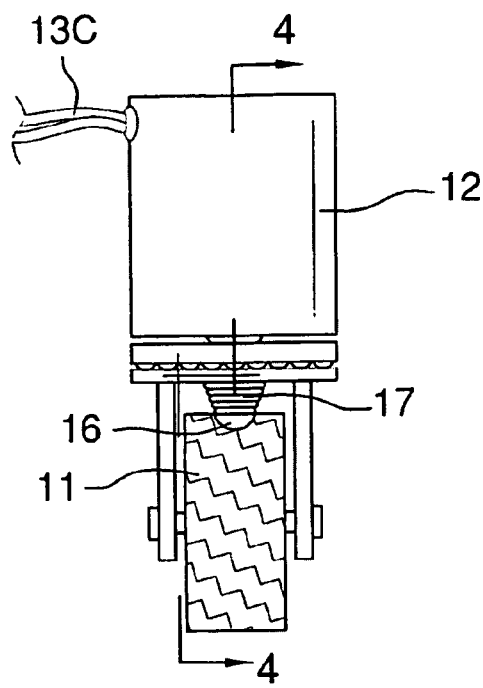
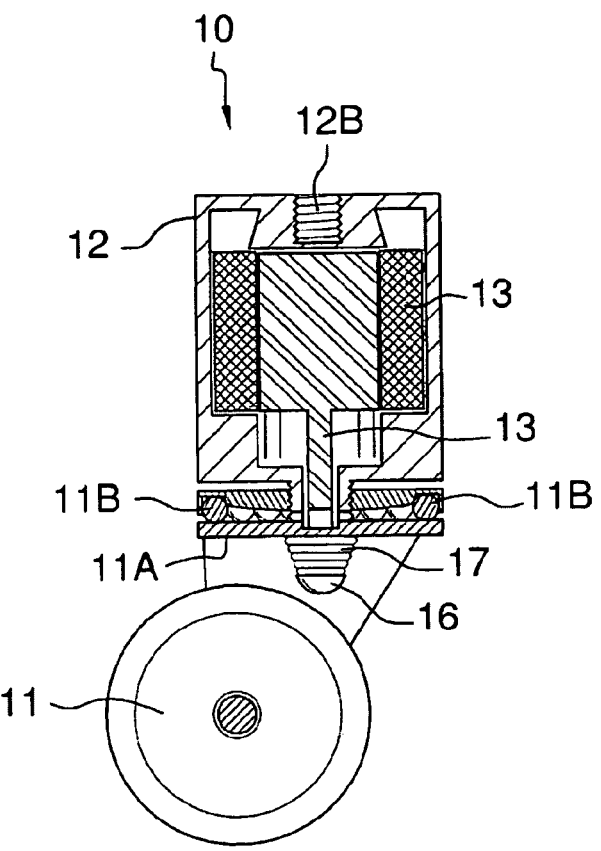
FIG. 3
FIG. 4

CASTER WHEEL HAVING INTEGRATED BRAKING MEANS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of caster wheels, more specifically, a caster wheel with an electrical braking system.

B. Discussion of the Prior Art

As a preliminary note, it should be stated that there is an ample amount of prior art that deals with caster wheels. As will be discussed immediately below, no prior art discloses a caster wheel with an integrated electrical braking system.

The Lange Patent (U.S. Pat. No. 5,184,373) discloses a caster wheel for a dolly or a cart that has an electrically activated brake which prevents rolling and turning movement of the wheel. However, the caster wheel braking system is not a component that screws into the top mounting bracket of the caster.

The Strong Patent (U.S. Pat. No. 7,159,695) discloses a dampening or braking system for a wheel for a dolly or a cart in which an electrically controlled pin is activated to press against the wheel. Again, the electrically controlled braking system is not a component that screws into the top mounting bracket of a caster wheel.

The Lin Patent (U.S. Pat. No. 6,834,746) discloses a caster wheel braking system in which a pin or other device is pressed against the wheel to prevent movement. However, the pin presses against a lower cam and disk that act as a brake to stop or impede the rotational movement of the caster wheel.

The Milbredt Patent (U.S. Pat. No. 6,584,641) discloses a manually operated brake and steering lock for the caster wheel of a rolling device in which a person presses a spring activated tab against the wheel. However, the manually operated brake is not electrically operated, and is not a component that is screwed into the top mounting bracket of the caster wheel.

The Neumann Patent (U.S. Pat. No. 4,414,702) discloses a device for preventing the movement of a caster wheel from rolling and swiveling in which a device is pressed against the wheel. However, the locking device does not attach to the top surface of the caster wheel mounting bracket.

While the above-described devices fulfill their respective and particular objects and requirements, they do not describe a caster wheel electronic braking system that screws into the top surface of the caster wheel mounting bracket. In this regard, the caster wheel having integrated electrical braking means departs from the conventional concepts and designs of the prior art.

SUMMARY OF THE INVENTION

The caster wheel having integrated electrical braking means involves a standard caster wheel and an electronic braking component that screws into the top surface of the caster wheel mounting bracket. The electrical braking component includes a solenoid that moves a pin up and down to impact a spring-loaded brake mounted underneath the caster wheel mounting bracket.

An object of the invention is to provide a caster wheel with integrated electrical braking means that screws onto the top surface of the caster wheel mounting bracket.

A further object of the invention is to provide an electronic braking component for a caster wheel that will stop the caster wheel from rotating when the rake is engaged upon the caster wheel.

A further object of the invention is to provide a caster wheel with electrical braking means that is easy-to-use, simplistic in design, effective, and affordable.

These together with additional objects, features and advantages of the caster wheel having integrated electrical braking means will be readily apparent to those of ordinary skill in the art upon reading the following detailed description of presently preferred, but nonetheless illustrative, embodiments of the caster wheel having integrated electrical braking means when taken in conjunction with the accompanying drawings.

In this respect, before explaining the current embodiments of the caster wheel having integrated electrical braking means in detail, it is to be understood that the caster wheel having integrated electrical braking means is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the caster wheel having integrated electrical braking means. It is therefore important that the claims be regarded as including such equivalent construction insofar as they do not depart from the spirit and scope of the caster wheel having integrated electrical braking means. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a side view of the invention;

FIG. 4 illustrates a cross-sectional view of the invention along line 4-4 in FIG. 3 with the brake in the off position;

DETAILED DESCRIPTION OF THE EMBODIMENT

Figure 1:
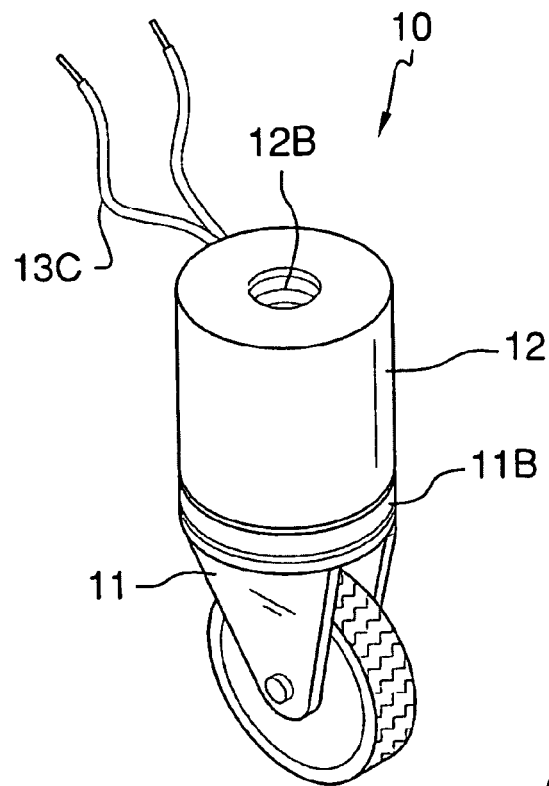
FIG. 1 illustrates a front, isometric view of the invention.
Figure 2:
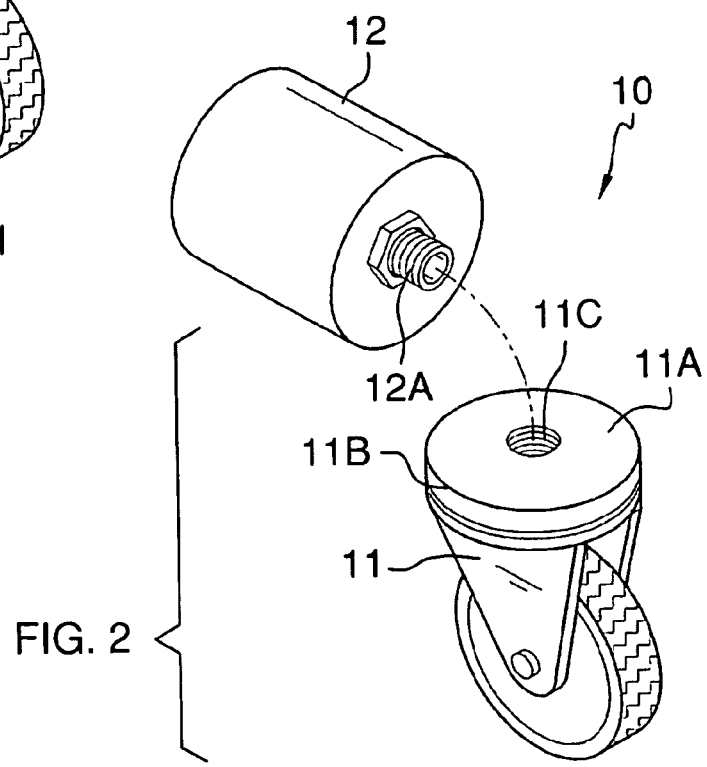
FIG. 2 illustrates a front, isometric view of the invention with the electronic braking component separated to reveal the bolt, which screws into the top surface of the caster wheel mounting bracket.
Figure 5:
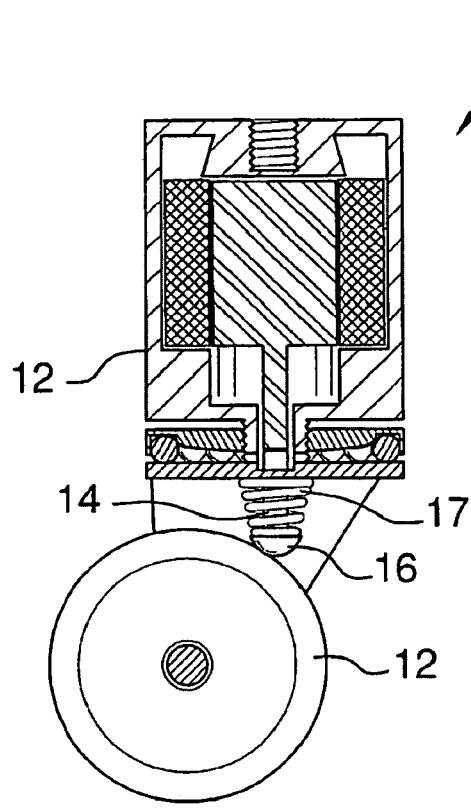
FIG. 5 illustrates a cross-sectional view of the invention along line 4-4 in FIG. 3 with the brake in the on position.
Figure 6:
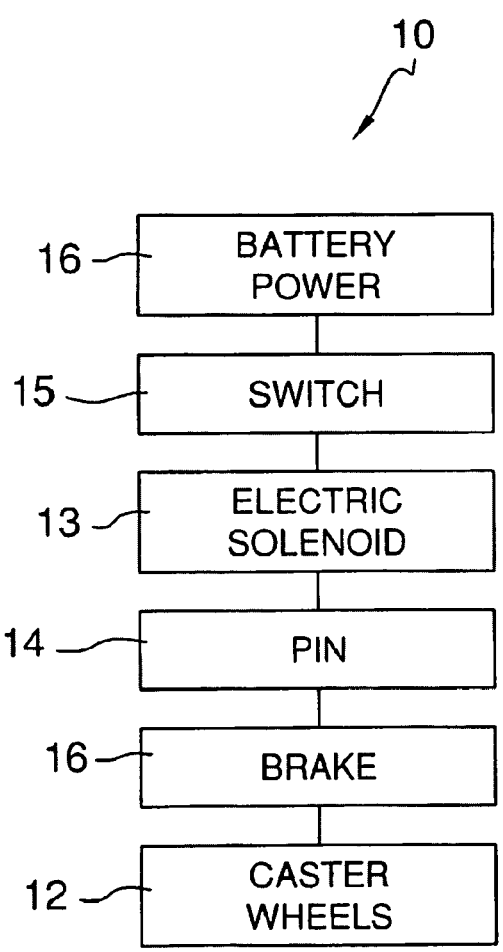
FIG. 6 illustrates a diagram of the various components of the invention.

Detailed reference will now be made to the preferred embodiment of the present invention, examples of which are illustrated in FIGS. 1-6. A caster wheel having integrated electrical braking means 10 (hereinafter invention) includes a caster wheel 11 and an electrical braking component 12.

The electrical braking component 12 has a bolt 12A along a bottom surface and a threaded opening 12B along a top surface. The electrical braking component 12 also includes a solenoid 13, and a pin 14. The solenoid 13 is electrically wired via wiring 13C to a power switch 15, which is wired to a battery power source 16.

The caster wheel 11 has a mounting bracket 11A, and a ball bearing 11B. The electrical braking component 12 is secured to the caster wheel 11 by screwing the bolt 12A of the electrical braking component 12 into a threaded opening 11C on the mounting bracket 11A.

The ball-bearing 11B of the caster wheel 11 enables the caster wheel 11 to rotate about the mounting bracket 11A, which in turn enables rotation of the electrical braking component 12. The threaded opening 12B enables the electrical braking component 12 to be secured to the bottom surface of an object (not shown) for which the invention 10 is being used in the same fashion as if the caster wheel 11 had been directly attached to said object.

The pin 14 attaches to a brake 16, which is positioned adjacent a spring 17 located on the bottom surface of the mounting bracket 11A. The spring 17 insures that a biasing force is placed upon the brake 16 as well as the pin 14. The spring 17 biases the pin upwards to insure unintentional braking of the caster wheel 11 without powering the solenoid 13. However, it shall be noted that the total force output of the solenoid 13 must be enough to overcome the biasing force of the spring 17 in addition to a braking force required to successfully stop the caster wheel 11 via the brake 16.

The pin 14 attaches to the brake 16 via an attaching means comprising welding, bolting, screwing, molding, or adhesive. The pin 14 and the brake 16 are made of a material comprising metal, rubber, durable plastic, aramid fibers, carbon fibers, or wood.

It is envisioned that the invention 10 be adapted for all typical applications including caster wheels. The invention 10 may be integrated into either an existing caster wheel or part of a new caster wheel. The simplicity of the construction of the invention 10 sets the invention 10 apart from the prior art because of the ease in converting the invention 10 to use with an existing caster wheel or a new caster wheel.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

CLAIMS

While the embodiments of the invention have been disclosed, certain modifications may be made by those skilled in the art to modify the invention without departing from the spirit of the invention.

The inventor claims:

1. A caster wheel having integrated electrical braking means comprising:
    (a) the caster wheel;
        wherein the caster wheel has a mounting bracket further including a threaded opening in a top surface thereof;
        wherein the caster wheel has a ball bearing located beneath the threaded opening, which enables the caster wheel to rotate;
    (b) the electrical braking means;
        wherein the electrical braking means has a solenoid attached to a pin for moving the pin;
        wherein the electrical braking means has a bolt along a bottom surface for screwing to the threaded opening to secure the electrical braking means to the mounting bracket, the pin extending through the bolt;
    (c) a brake
        wherein the brake attaches to a bottom surface of the pin, and is movable with the pin to engage an outer surface of the caster wheel to provide braking;
        wherein a spring is positioned between the bottom surface of the mounting bracket and the brake such that a biasing force pushes the brake away from the outer surface of the caster wheel;
        wherein the solenoid is controlled by a switch and electrical source such that when the solenoid is energized, the pin and thus brake extends downward and touches the outer surface of the caster wheel.

2. The caster wheel as described in claim 1 wherein the pin is attached to the brake by a securing means comprising bolting, screwing, welding, molding the two parts together, or adhesive.

3. The caster wheel as described in claim 2 wherein the pin and the brake are made of a material comprising a metal, rubber, durable plastic, aramid fiber's, carbon fibers, or wood.

4. An electrical braking means kit for use with a caster wheel comprising:
    (a) the caster wheel;
        wherein the caster wheel has a mounting bracket further including a threaded opening in a top surface thereof;
        wherein the caster wheel has a ball bearing located beneath the threaded opening, which enables the caster wheel to rotate;
    (b) an electrical braking means;
        wherein the electrical braking means has a solenoid attached to a pin for moving the pin;
        wherein the electrical braking means has a bolt along a bottom surface for screwing to the threaded opening to secure the electrical braking means to the mounting bracket, the pin extending through the bolt;
    (c) a brake
        wherein the brake attaches to a bottom surface of the pin, and is movable with the pin to engage an outer surface of the caster wheel to provide braking;
        wherein a spring is positioned between the bottom surface of the mounting bracket and the brake such that a biasing force pushes the brake away from the outer surface of the caster wheel;
        wherein the solenoid is controlled by a switch and electrical source such that when the solenoid is energized, the pin and thus brake extends downward and touches the outer surface of the caster wheel.

5. The electrical braking means kit as described in claim 4 wherein the pin is attached to the brake by a securing means comprising bolting, screwing, welding, molding the two parts together, or adhesive.

6. The electrical braking means kit as described in claim 4 wherein the pin and the brake are made of a material comprising a metal, rubber, durable plastic, aramid fibers, carbon fibers, or wood.

* * * * *